(12) United States Patent
Bryan et al.

(10) Patent No.: US 9,959,383 B1
(45) Date of Patent: May 1, 2018

(54) APPARATUS, METHOD AND SYSTEM FOR BROKERING AND PROVISION OF INTELLIGENT ADVERTISEMENT

(75) Inventors: David Alan Bryan, Carmel, NY (US); Gene Rhough, New York, NY (US)

(73) Assignee: Time Warner, Inc., New York, NY (US)

( * ) Notice: Subject to any disclaimer, the term of this patent is extended or adjusted under 35 U.S.C. 154(b) by 2847 days.

(21) Appl. No.: 10/937,963

(22) Filed: Sep. 10, 2004

Related U.S. Application Data

(63) Continuation-in-part of application No. 10/835,834, filed on Apr. 30, 2004.

(51) Int. Cl.
*G06F 17/00* (2006.01)

(52) U.S. Cl.
CPC .................... *G06F 17/60* (2013.01)

(58) Field of Classification Search
USPC .............................................. 705/14; 706/12
See application file for complete search history.

(56) References Cited

U.S. PATENT DOCUMENTS

| | | | |
|---|---|---|---|
| 5,017,143 A | | 5/1991 | Backus et al. |
| 5,200,825 A | * | 4/1993 | Perine .......................... 348/722 |
| 5,255,090 A | | 10/1993 | Israelsen |
| 5,721,827 A | * | 2/1998 | Logan et al. ................. 709/217 |
| 5,805,155 A | | 9/1998 | Allibhoy et al. |
| 5,805,974 A | | 9/1998 | Hite et al. |
| 5,850,218 A | | 12/1998 | LaJoie et al. |
| 5,907,350 A | | 5/1999 | Nemirofsky |

(Continued)

FOREIGN PATENT DOCUMENTS

| | | |
|---|---|---|
| WO | WO 0065838 A2 | 11/2000 |
| WO | WO 0110115 | 2/2001 |

(Continued)

OTHER PUBLICATIONS

"TV's Future May Be Web Search Engines That Hunt for Video", The Wall Street Journal, Dec. 16, 2004.

*Primary Examiner* — Rutao Wu
(74) *Attorney, Agent, or Firm* — Gottlieb, Rackman & Reisman, P.C.

(57) ABSTRACT

The disclosure details the implementation of an apparatus, method, and system for brokering SmartAds. The disclosure teaches a efficient ad brokering as between advertisers, broadcast service providers, and media consumers by employing a SmartAds Client (SAC) and a SmartAds Server (SAS). The SAC may provide viewers with programming and integrate ads in an intelligent manner based on criteria supplied to it. The SAC is used to display SmartAds to television viewers. The ad brokering SAS is complementary to the SAC media consumer and provides services, ads, and ad related information to the SAC. By employing intelligence from a SAC and SAS, ads may be dynamically provided, changed, and/or augmented with programming. The SAS collects and matches media consumer profiles and advertiser bids against one another and an ad database to provide better targeted ads to media consumers. The manner and way in which this is achieved, results in the expiration of stale ads. Such stale ads are replaced with more intelligent, dynamically placed ads that are better targeted, tracked, and managed.

13 Claims, 8 Drawing Sheets

(56) References Cited

U.S. PATENT DOCUMENTS

| | | | |
|---|---|---|---|
| 5,918,014 A * | 6/1999 | Robinson | 709/219 |
| 5,930,526 A | 7/1999 | Iverson | |
| 5,937,392 A * | 8/1999 | Alberts | 705/14.52 |
| 6,009,116 A | 12/1999 | Bednarek et al. | |
| 6,029,045 A | 2/2000 | Picco et al. | |
| 6,031,572 A | 2/2000 | Christopoulos | |
| 6,049,333 A | 4/2000 | LaJoie et al. | |
| 6,175,831 B1 | 1/2001 | Weinreich et al. | |
| 6,285,987 B1 * | 9/2001 | Roth et al. | 705/27 |
| 6,314,452 B1 | 11/2001 | Dekel et al. | |
| 6,340,987 B1 | 1/2002 | Hayashi | |
| 6,350,082 B1 | 2/2002 | Rickards | |
| 6,351,596 B1 | 2/2002 | Ostrover | |
| 6,357,042 B2 | 3/2002 | Srinivasan et al. | |
| 6,369,840 B1 | 4/2002 | Barnett et al. | |
| 6,374,290 B1 | 4/2002 | Scharber et al. | |
| 6,389,372 B1 | 5/2002 | Glance et al. | |
| 6,493,872 B1 | 12/2002 | Rangan et al. | |
| 6,493,876 B1 | 12/2002 | DeFreese et al. | |
| 6,536,043 B1 | 3/2003 | Guedalia | |
| 6,698,020 B1 | 2/2004 | Zigmond et al. | |
| 6,718,551 B1 | 4/2004 | Swix et al. | |
| 6,754,443 B2 | 6/2004 | Nelson et al. | |
| 6,754,904 B1 | 6/2004 | Cooper et al. | |
| 6,842,782 B1 * | 1/2005 | Malik et al. | 709/224 |
| 7,013,478 B1 | 3/2006 | Hendricks et al. | |
| 7,134,132 B1 | 11/2006 | Ngo et al. | |
| 7,266,832 B2 | 9/2007 | Miller | |
| 7,395,546 B1 | 7/2008 | Asmussen | |
| 7,676,142 B1 | 3/2010 | Hung | |
| 7,779,438 B2 | 8/2010 | Davies | |
| 2001/0039657 A1 | 11/2001 | Fopeano et al. | |
| 2002/0053084 A1 | 5/2002 | Escobar et al. | |
| 2002/0056088 A1 | 5/2002 | Silva et al. | |
| 2002/0087978 A1 | 7/2002 | Nicholson et al. | |
| 2002/0104083 A1 | 8/2002 | Hendricks et al. | |
| 2002/0123928 A1 | 9/2002 | Eldering et al. | |
| 2002/0124247 A1 | 9/2002 | Houghton | |
| 2002/0131511 A1 | 9/2002 | Zenoni | |
| 2002/0144262 A1 | 10/2002 | Plotnick et al. | |
| 2002/0184634 A1 | 12/2002 | Cooper | |
| 2003/0014407 A1 | 1/2003 | Blatter et al. | |
| 2003/0026593 A1 | 2/2003 | Ostrover | |
| 2003/0028873 A1 | 2/2003 | Lemmons | |
| 2003/0050977 A1 | 3/2003 | Puthenkulam et al. | |
| 2003/0061607 A1 | 3/2003 | Hunter et al. | |
| 2003/0074661 A1 | 4/2003 | Krapf et al. | |
| 2003/0093784 A1 | 5/2003 | Dimitrova et al. | |
| 2003/0101451 A1 | 5/2003 | Bentolila et al. | |
| 2003/0145331 A1 | 7/2003 | Escobar et al. | |
| 2003/0149975 A1 | 8/2003 | Eldering et al. | |
| 2003/0172376 A1 * | 9/2003 | Coffin, III | 725/22 |
| 2003/0182567 A1 | 9/2003 | Barton et al. | |
| 2003/0208763 A1 | 11/2003 | McElhatten et al. | |
| 2003/0221191 A1 | 11/2003 | Khusheim et al. | |
| 2004/0003118 A1 | 1/2004 | Brown et al. | |
| 2004/0010807 A1 | 1/2004 | Urdang et al. | |
| 2004/0015999 A1 | 1/2004 | Carlucci et al. | |
| 2004/0040035 A1 | 2/2004 | Carlucci et al. | |
| 2004/0049780 A1 | 3/2004 | Gee | |
| 2004/0158858 A1 | 8/2004 | Paxton et al. | |
| 2004/0186769 A1 * | 9/2004 | Mangold et al. | 705/14 |
| 2004/0221308 A1 | 11/2004 | Cuttner et al. | |
| 2004/0231003 A1 | 11/2004 | Cooper et al. | |
| 2006/0225088 A1 | 10/2006 | Gutta | |
| 2007/0067800 A1 | 3/2007 | Wachtfogel et al. | |
| 2007/0101360 A1 | 5/2007 | Gutta et al. | |
| 2007/0294740 A1 | 12/2007 | Drake et al. | |
| 2008/0216111 A1 | 9/2008 | Alten et al. | |
| 2009/0077580 A1 | 3/2009 | Konig et al. | |
| 2009/0094637 A1 | 4/2009 | Lemmons | |
| 2009/0193458 A1 | 7/2009 | Finseth et al. | |
| 2010/0251288 A1 | 9/2010 | Carlucci et al. | |
| 2011/0321087 A1 | 12/2011 | Huber et al. | |

FOREIGN PATENT DOCUMENTS

| | | |
|---|---|---|
| WO | WO 0110115 A1 | 2/2001 |
| WO | WO 0110118 | 2/2001 |
| WO | WO 0110118 A1 | 2/2001 |
| WO | WO 01/10118 A1 | 8/2001 |
| WO | WO 0161997 | 8/2001 |
| WO | WO 0177954 | 10/2001 |
| WO | WO 0177954 A2 | 10/2001 |
| WO | WO 0178401 | 10/2001 |
| WO | WO 0178401 A2 | 10/2001 |
| WO | WO 01/50742 A1 | 12/2001 |
| WO | WO 01/50753 A1 | 12/2001 |
| WO | WO 0235840 | 5/2002 |
| WO | WO 0237853 | 5/2002 |
| WO | WO 2004/004186 A2 | 1/2004 |

* cited by examiner

APPARATUS, METHOD AND SYSTEM FOR BROKERING AND PROVISION OF INTELLIGENT ADVERTISEMENT

This is a continuation-in-part of co-pending application Ser. No. 10/835,834, filed Apr. 30, 2004.

RELATED APPLICATIONS

The present application claims priority under 35 USC 119 to provisional patent application Ser. No. 10/853,834, filed Apr. 30, 2004, and is herein incorporated by reference.

FIELD

The present invention is directed generally to an apparatus, method, and system of advertising, and more specifically to an apparatus, method and system to use new advertising for already deployed programming by employing context, intelligence, and rules.

BACKGROUND

Advertising Systems

Typically, advertisements are disseminated along with content through broadcast media such as radio and television. Generally, advertisers pay to expose their advertisements to public viewers. In the broadcast medium, advertisers pay to air ads during specified times for specified programs in an attempt to make an impression on an estimated demographic and population size that are known to view a given program. Nielsen's ratings provide such estimates and the broadcast industry employs Nielsen ratings to set the costs for airing advertisements. In turn, the advertising time provides advertisers with an opportunity to make an impression on an audience.

Local and national broadcast stations and networks sell advertising slots for particular channels, times and durations. The decision making for the context, timing, format, and placement of advertisements is made by high level advertising/marketing decision makers. The decision makers purchase advertising slots and provide a finished advertisement to local and/or national broadcasters. Accordingly, the broadcasters insert the ads into the programs that they broadcast.

On the World Wide Web, advertisers are known to pay for advertisement impressions. The impressions are measured by Information Servers that track the number of times an advertisement is loaded by a Web browser. As such, Web sites on the Internet are able to charge advertisers based on a measured number of impressions.

Information Technology Systems

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

Networks

Networks are commonly thought to comprise the interconnection and interoperation of clients, servers, and intermediary nodes in a graph topology. It should be noted that the term "server" as used herein refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

SUMMARY

Although all of the aforementioned advertising systems exist, no effective solution exists to replace stale ads in programs dynamically. Currently, ads are deployed at the time of broadcast and remain affixed to the broadcast program. Further, current ads are not targeted intelligently to individual and/or small groups of viewers based on information available at the viewers' locality. Also, as programs and their accompanying ads sit in storage in Personal/Digital Video Player/Recorders (PVPs, DVPs, PVRs, DVRs—hereinafter, collectively, DVRs), ads within the stored programming go stale and become less relevant over time. Yet when viewers view such long stored programming materials, they still endure the old commercials. This disclosure improves over the prior art by introducing SmartAds, a SmartAds Client (SAC) and a SmartAds Server (SAS). The SAC may provide viewers with programming and integrate ads in an intelligent manner based on criteria supplied to it. The disclosed SmartAds improve upon regular ads by better targeting and placing ads. The SAS is complementary to the SAC and provides services, ads, and ad related information to the SAC. By employing intelligence from a SAC and SAS, ads may be dynamically provided, changed, and/or augmented with programming. This arrangement allows the SAC to deploy ads based on targeting information at local viewers with greater flexibility. The SAC provides the advantage of tailoring advertising to local viewers with greater efficacy, while not requiring the traditional advertising/marketing decision makers to decide upon the selection and placement of such ads. Instead the decision making is left to the SAC. The SAC also prevents the viewer from having to view out-of-date ads. Such stale ads are replaced with more intelligent, dynamically placed ads that are better targeted, tracked, and managed. Moreover, prior to this disclosure, no system existed to enable for efficient ad brokering as between advertisers, broadcast service providers, and media consumers. The manner and way in which this is achieved, results in an apparatus, system, and method that was heretofore unavailable.

In accordance with certain aspects of the disclosure, the above-identified problems are overcome and a technical advance is achieved in the art of brokering ads. An exemplary method to place smart ads on a computer follows. The method comprises generating a profile for a media consumer and then tracking indicia regarding media consumption for media consumers in the profile. The indicia is stored in a profile for the media consumer. The profile is sent to a profile database, wherein the central profile database is accessible by an ad broker, and the profile is stored in the profile database.

BRIEF DESCRIPTION OF THE DRAWINGS

The accompanying drawings illustrate various non-limiting, example, inventive aspects in accordance with the present disclosure.

The leading number of each reference number within the drawings indicates the first figure in which that reference number is introduced. As such, reference number 101 is first introduced in FIG. 1. Reference number 201 is first introduced in FIG. 2, etc.

DETAILED DESCRIPTION

The disclosed SmartAds improve upon current ads by better targeting viewers. By employing intelligence from a SmartAd Client (SAC) and SmartAd Server (SAS), ads may be dynamically provided, changed, and/or augmented with broadcast programming.

Entity Topology

Figure 1:
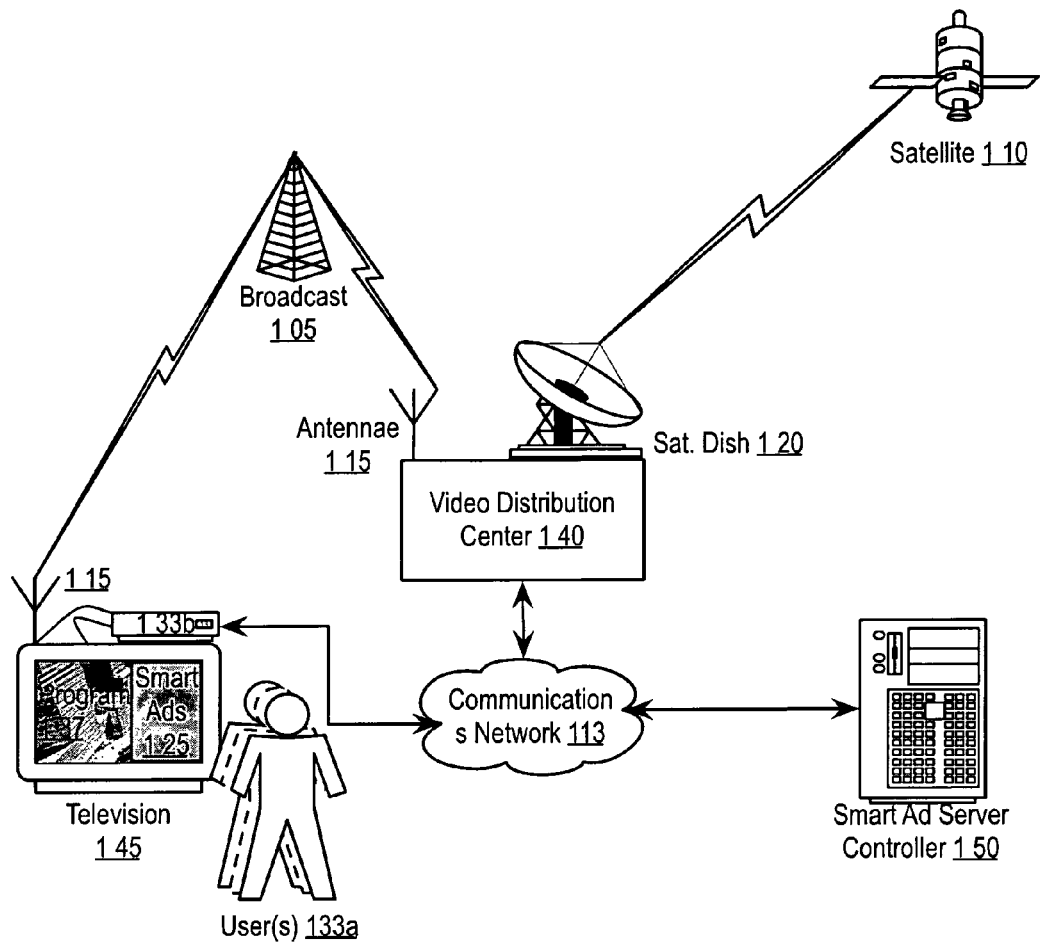
FIG. 1 is of a data-flow diagram illustrating embodiments as a topology for a SmartAd delivery.

FIG. 1 is of a data-flow diagram illustrating embodiments as a topology for SmartAd delivery. In this embodiment, users 133a view programs 137 on a television 145. The television is interfaced with a SAC controller 133b, typically through a coaxial, RCA, component, and/or the like interface. Optionally, the television is interfaced to receive broadcast signals through its antennae 115 from a broadcast station 105. The antennae 115 may also be connected into the SAC 133b. In one embodiment, the SAC is integrated into a cable box. In another embodiment, the SAC is integrated into a satellite receiver. In another embodiment, the SAC is integrated into a DVR. In yet another embodiment, the SAC is integrated into a combination of a cable and/or satellite receiver and a DVR.

As the SAC is connected into an input connection on a television, it thereby provides a video source. The SAC may supply programming 137 by relaying it from numerous sources such as a broadcaster 105, a video distribution center 140, satellite 110, SmartAd Servers (SAS) 150, other servers (not pictured), and or the like. The SAC may generate its own information for display in the form of User Interface (UI) components, textual, audio, and visual information. Similarly, the SAC may obtain data for the generation of information from data providers such as from a SAS 150.

In one embodiment, the SAC generates and/or displays SmartAds 125 on a television 145 for users 133a to view. The SAC itself may be interconnected to various information providers across a plurality of communications networks. In one embodiment, the SAC is disposed in communication with a communications network 113 to a video distribution center 140 (e.g., a cable television provider), and a SAS 150. The SAC may also connect to other information input sources such as a broadcast antennae 115, satellite feeds (not pictured), and/or the like. It should be noted that the SAS may be housed or integrated into a video distribution center 140, or alternatively, it may operate independently.

In one embodiment, the video distribution center 140 obtains programming (i.e., through broadcast reception 115, satellite feed 110, programming receipt by way of stored data (i.e., tapes, DVDs, etc.), and/or the like) and provides the programming to the SAC. Employing DVR functionality, the SAC may store such programming along with any included advertising in its own storage device. Alternatively, the SAC may provide a direct feed as received to the users for viewing.

In one embodiment, the SAS 150 obtains ads and stores them similarly to the way that the SAC obtains programming. The SAS may obtain ads from a video distribution center 140 and caches them in its own storage device for retrieval. Ads may be identified by obtaining a schedule of ad titles and times of broadcasting from a video distribution center 140 and recording them. Alternatively, ads may be delivered to a SAS similarly to the way they are delivered to a video distribution center. Metadata associated with each ad is stored in the SAS's database including an ad title, advertiser, length, and other identifying information. In an alternative embodiment, the SAC may similarly obtain ads. In yet another alternative embodiment, the SAC may obtain ads from the SAS.

As such, in one embodiment, the SAC may obtain and/or cache programming information from broadcasters 105, cable providers 140, satellite providers 110, and/or the like over a communications network 113. Also, the SAC may obtain ads from any of the above sources, but commonly, it may obtain information from a SAS 150 over a communications network 113.

In an alternative embodiment, the SAC sends different ads to different viewers, even in cases where the same program is being watched by different viewers at the same time. This capability requires either a playback device with multiple outputs that can be routed to different receivers simultaneously, or receivers with local storage of (at least) ads and/or program streams.

Thereafter, the SAC may provide users 113a with programming 137 and integrate ads 125 in an intelligent manner based on criteria supplied to it. Thus, the SAC may determine how ads are to be displayed 125 to viewers 133a based on information available at the SAC. This arrangement allows the SAC to deploy ads based on targeting information at local viewers 133a with greater flexibility. The targeting information and local SAC information allow further refinement and decisions regarding ad deployment to be made by the SAC at the viewer's home. The SAC provides the advantage of tailoring advertising to local viewers with greater efficacy, while not requiring the traditional advertising/marketing decision makers to decide upon the selection and placement of such ads. Instead the decision making is left to the SAC.

SmartAd Format Types

Figure 2:
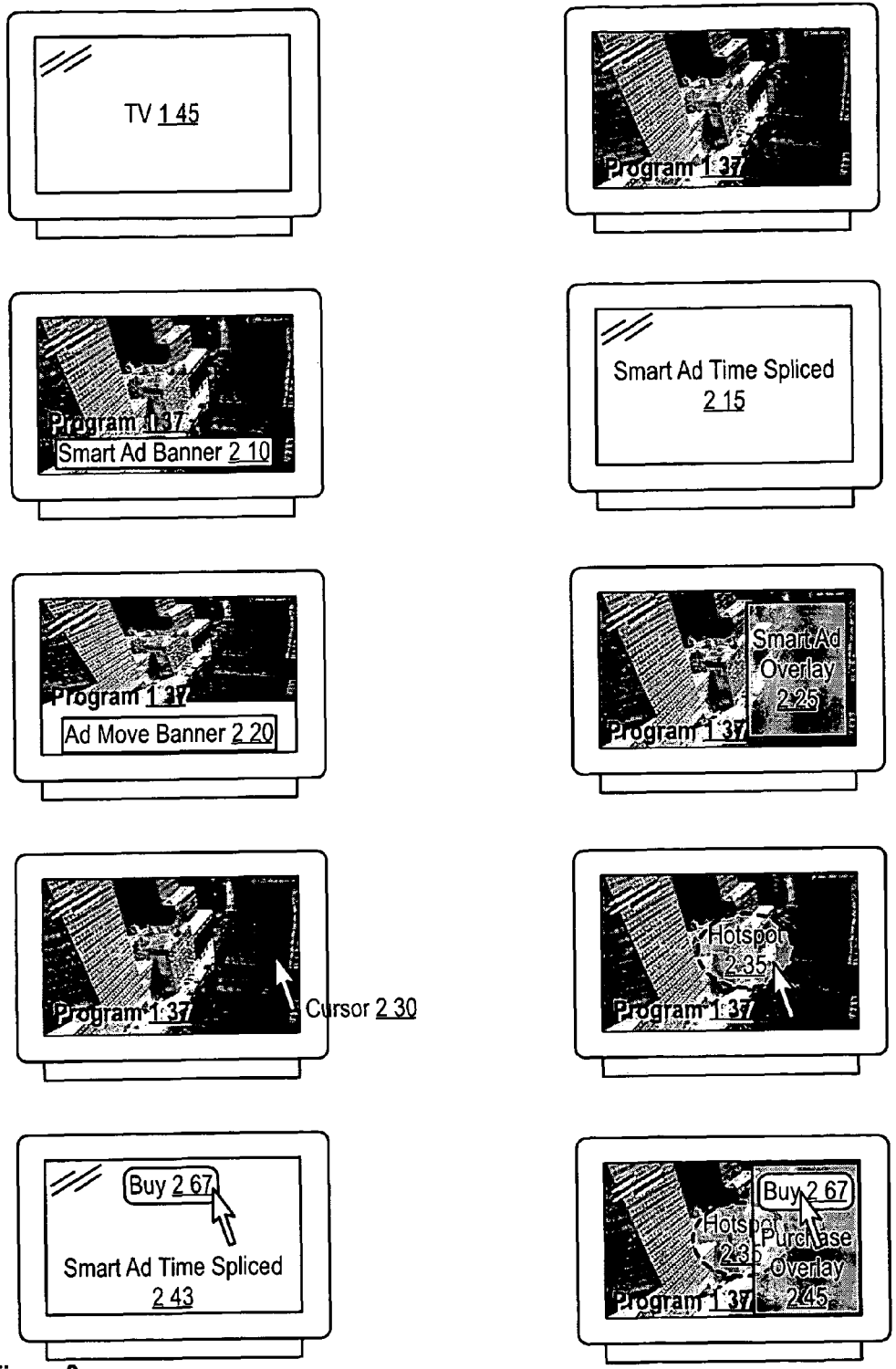
FIG. 2 is of a block diagram illustrating embodiments of types of SmartAd formats.

FIG. 2 is of a block diagram illustrating embodiments of types of SmartAd formats. The SAC 133b is capable of incorporating many different ad formats for display on a television 145. Viewers 133a watch programming 137 on their television, which acts as a draw for advertising. Generally, the SAC allows the user to operate their television as a normal television and/or DVR controlled television. However, when the SAC determines that intelligent ad placement is required (as will be described in greater detail later in the disclosure), it is capable of providing the advertising content in the form of inter-spliced video, overlays, and/or the like. For SmartAd placement, the SAC may employ video layering, compositing, and file splicing techniques as currently employed in various DVRs, consoles, and cable and satellite receivers. For example, mythTV provides a sufficient infrastructure for such base compositing.

SmartAds may be saved by the user for later viewing separate from a program if the user has an interest and/or liking in the ad. SmartAds may be formatted as simple composited images, videos, and/or audio. Alternatively, SmartAds may be formatted as XML and/or HTML blocks, thereby allowing user interaction as interpreted by a built in Web server on the SAC. Thus, for any of the ad types, the user may interact with the SmartAd by engaging a cursor control on a remote and selecting the ad and/or its components, which would provide further information and/or options to the viewer. In an alternative embodiment, SmartAds may employ Flash and/or QuickTime media formats. In an alternative embodiment, SmartAds may employ media types commonly referenced by XML/HTML blocks such as, but not limited to: .aac, HTML, .gif, .jpg, .mp3, .mpeg, .mov .png, .tiff, XML, .wav, .wmv, and/or the like. Further, The SmartAd may provide any audio, static and/or text, image, and/or video within its bounds. In addition to video applications, SmartAds may be inserted into any multimedia form of content, i.e., audio (e.g., broadcast radio), textual, and/or other forms. For example, audio ads may be placed into retrieved text files.

Banners

In one embodiment, the SAC may overlay a SmartAd Banner 210 atop the program. The banner simply overlays an area of the program 137 allowing the program to continue to play while the banner is shown for a specified duration of time. Also, the viewer may engage the SmartAd Banner obtaining further information and/or options. It should be noted that the banner may take on any shape and or size; further, the banner may be opaque and/or employ levels of transparency.

Spliced

In one embodiment, the SAC may interpose an advertisement between segments of programming 137. For example, a program that is stored may contain ads. In the case where the program was obtained from a video distribution center 140, the program might have been broadcast with breaks into which the broadcaster and/or video distribution center aired its own advertising. The SAC may identify such advertising in several manners. In one embodiment, the SAC may analyze program data for codes, flags, and otherwise lulls in the programming to discern ad placement. In an alternative embodiment, the SAC may employ advertising schedules. Advertising schedules may be obtained from broadcasters 115 and/or video distribution centers 140 as to when ads are aired. Thus, by referencing its advertising schedule, the SAC may identify the time codes of when and which ads were aired during a particular program broadcast. Once the start and end points of advertisements within a given program are identified, the SAC may then play another advertisement in place of the original ad. It may achieve this by simply pausing play of the originally recorded program and ad, and playing and/or retrieving a new ad in its place. Upon showing the new ads, play of the stored program may resume past the end point of the last block of ads that was recorded with the program. In an alternative embodiment, the original program may be recorded without storing the original advertisements; instead, the SAC may store an advertising flag creating an advertising slot into which new ads may be inserted. In such a manner, the SAC intersperses or splices 215 new ads into older programming.

In an alternative embodiment, instead of retrieving ads stored on the SAC, the SAC may retrieve ads across the communications network 113 from a SAS and/or other source as long as the SAC may retrieve such ads in real-time. In yet another embodiment, the SAC may employ an advertising schedule to obtain real-time broadcasts of ads from different channels and intersperse them into stored and/or live content. For example, a viewer might be watching a television show as directly broadcast on channel 4 and at a specified time, the SAC would pull in a live feed of an advertisement on channel 7, wherein the ad from channel 7 is being broadcast live at the same time as a viewer would otherwise see an ad on channel 4. In this manner both live and stored programming and ads may be spliced. In another embodiment, the SAC may cache ads from a server 150.

In another alternative embodiment, the SAC may subtly speed up, and or slow down the speed at which programs and/or advertisements are played. By speeding up or slowing down play of stored programs and/or ads by a few percent, the viewer will generally not notice. However, this added flexibility will allow the SAC to better synchronize the concurrence of stored programs with any real-time broadcast advertisements.

Ads may be spliced into programming in a number of ways. In one embodiment, the SAC is instructed to play an ad at an absolute time. For example, play a specified ad at 9:15 PM. In an alternative embodiment, the SAC is instructed to play an ad based on relative time. For example, play a specified ad at 15 minutes into a specified program. In another embodiment, the SAC is instructed to play an ad based on an available position. For example, play a specified ad at the first natural advertising slot.

It is important to note that ad splices (and other ad types) may be interspersed into sections of programming not originally designated for advertisements. Thus, while the broadcaster and/or video distribution center may provide only three blocks of ads during a program at 5, 30, and 45 minutes into the programming (i.e., natural ad slots), the SAC may pause play of the programming at any time (e.g., at 12 minutes into the programming) and resume the program after playing any ads. Alternatively, the SAC may honor natural ad slots and limit itself splicing ads only into such natural ad slots.

Move Banner

In one embodiment, the SAC may move a SmartAd Banner 220 into a frame, thereby displacing the program. The SAC resizes the program 137 to occupy less of the television display and displays a banner in the empty room provided by the resized program 220. This allows the viewer to see both the ad and a representation of the full program. Ad frames may occupy horizontal and/or vertical peripheries. Such an arrangement prevents the program from being obscured by the banner ad. Also, the viewer may engage the SmartAd Banner obtaining further information and/or options.

Overlay

In one embodiment, the SAC may overlay a SmartAd 225 atop the program. The overlays cover the program 137 allowing the program to continue to play while the overlay is shown for a specified duration of time. In an alternative embodiment, the overlay causes the program to pause. The overlay works very much like a banner, but generally occupies a greater portion of the available display area. As such, in addition to picture in picture functionality, the overlay allows for various user interface elements to be displayed and interacted with within its bounds. So various widgets, e.g., buttons, may be engaged which may bring up further overlays. The overlays in general act much like windows in various GUIs, acting as generalized and movable receptacles. Further, the overlays may be dismissed through user interaction by the user engaging a user interface widget, such as a close box, to dismiss the overlay. Furthermore, overlays may be used to provide purchasing information. This provides an area where a viewer may interact with a SmartAd and actually select and complete a transaction and order an advertised product. It should be noted that the banner may take on any shape and or size; further, the banner may be opaque and/or employ levels of transparency.

Cursors

In one embodiment, the SAC may provide cursor 230 selection mechanisms. For example, many DVD player remotes include multi-directional cursor control pads that may be used to navigate across a Cartesian coordinate space and to engage selectable object by depressing a button.

Hotspots

In one embodiment, the SAC may provide hotspot 235 selection targets. The hotspots cover a specified region of a program 137 and come in and out of existence at specified times. In one embodiment, the hotspots correspond to objects viewable in the program. This allows the hotspots to exist for specified durations of time while allowing the program to continue to play. The hotspots act similarly to banners except they are usually not visible. In one embodiment, the hotspots subtly highlight objects as they come into existence by surrounding the object with an outline and light transparent area fill. In another embodiment, the hotspots remain invisible unless a viewer navigates a cursor to intersect the hotspot, at which point the hotspot will highlight its circumscribed area 235. In another embodiment, engaging the hotspot by selecting it with a cursor 230 will cause the program to pause. In one embodiment, upon engaging the hotspot, an overlay providing greater information about the hotspot target is brought up for further viewer interaction.

Purchases

In one embodiment, the SAC may allow users to engage in commercial transactions through SmartAd interactions. For example, a user may see a building while viewing a program. If there is a hotspot for the building 235, and the viewer selects the building 235, an overlay to rent office space in the building may be retrieved from the SAC's advertising database and displayed to the viewer. In one embodiment, the overlay may act to pause the program and occupy the entire screen 243. The user may then engage in searching for more information about the product by navigating the purchase overlay as if it were a regular Web page. Upon deciding to make a purchase, the user engages a widget indicating their desire to purchase the advertised item 267. Doing so forwards a post instruction from the SAC to a SAS, which in turn forwards an order to the advertiser. In an alternative embodiment, the overlay 243 is provided live by the advertiser, and the transaction takes place at the advertiser's server. Payment information (i.e., name, address, credit card information, etc.) may be stored in a record and/or cookie form on the SAC and securely forwarded. In an alternative embodiment, payment information may be entered through a Web interface (e.g., by using a wireless keyboard/keypad disposed in communication with the SAC).

In an alternative embodiment, upon engaging the hotspot for the item 235, an overlay may occupy a part of the display 245, allowing the viewer to secure a purchase 267 while the program 137 continues to display.

SmartAd Deployment

Figure 3:
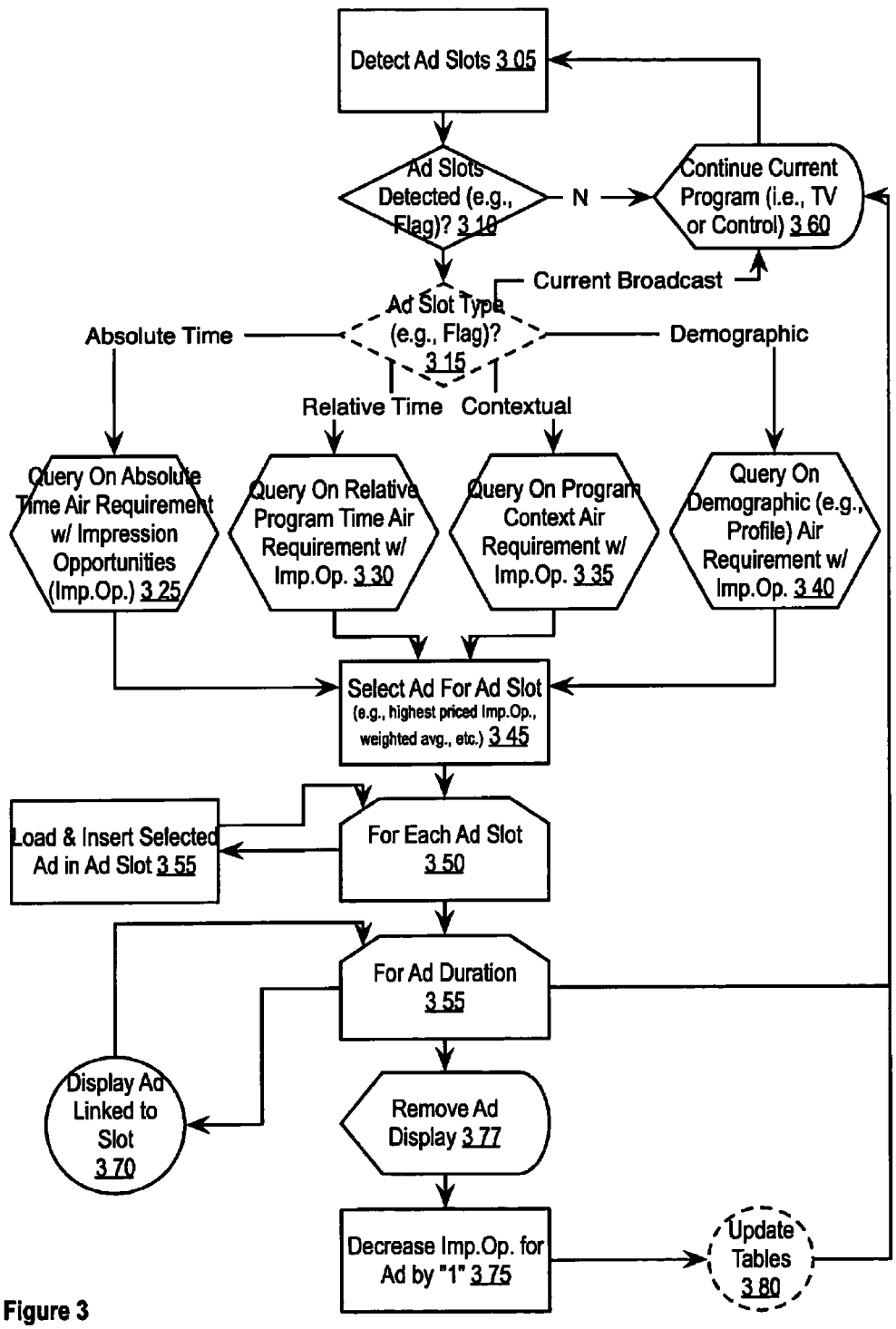
FIG. 3 is of a logic-flow diagram illustrating embodiments of SmartAd deployment.

FIG. 3 is of a logic-flow diagram illustrating embodiments of SmartAd deployment. In one embodiment, the following logic-flow executes generally at a SAC 133b. It should be noted that many of the modules and database entries (as will be described in greater detail in FIGS. 6 and 7) are similar as between a SAC and a SAS. As such, many operational elements may execute interchangeably on either or both of the SAC and SAS. In one embodiment, the SAC contains a subset of module and database information as found on the SAS, wherein the subset acts as a targeted cache of the SAS.

Natural ad slot detection within a program may occur in various manners as has already been discussed in FIG. 2. It should be noted that discovery of natural ad slots may occur at the time of a user viewing a program. Alternatively, the SAC may search through all programs stored in its storage device and identify natural advertising slots. In one embodiment, the SAC can engage in the search for ad slots for SmartAd deployment at specified intervals; this may be achieved by executing such searches through a Unix cron process and/or the like. Further, the SAC may schedule ads for placement at various times and dictate and/or otherwise create ad slots by saving a start/stop flag associated with a specific program, wherein the start/stop flag specifies a point in time at which an ad slot is created. In general this is achieved by creating a to-do list for ads. Depending on payments made and placement requirements as specified by ad rules, ad slots are generated for both absolute and program relative times.

In another embodiment, detection of ad slots is achieved in an on-demand basis 305. In such an embodiment, the SAC creates and maintains an ad slot queue, various rules, and expiration information in a database table. Thus, the SAC checks with the SAC expiration table for ad slots that may be upcoming in the near future as well as checking for any ad slots present and/or associated with the currently viewed program. If no ad slots are detected for the upcoming program and/or period of time after checking for ad slots in the SAC database and in the current program 305, 310, then the program continues to display on the user's display 360 and detection will recur at a later time 305.

If the SAC detects ad slots 310, various queries on the SAC database may ensue 325, 330, 335, 340. The SAC may execute queries serially, i.e., one at a time, or in parallel 315. The SAC determines what type ad slot is available 315. For example, there may be several ad slots competing for the same time. There may be ad slots that are to be aired at an absolute time, if at all, e.g., show a specified ad only at 9:36 PM. However, there may be a natural ad slot based on various demographics requirements that would also air for a specified program at roughly the same time. Although ad slots are not necessarily limited to any given type, they may be reserved for airing only certain types of ads. The determinant in this regard is a rule given to specify limitations on the types of ad slots that are to occur. Thus, in an embodiment allowing only specific types of ads to fulfill specified ad slot types, a serial determination 315 may occur where only one type of query on the SAC database would follow 325, 330, 335, or 340. Alternatively, when there is no ad slot type limitation requirement 315, multiple queries on the SAC database may occur 325, 330, 335, and 340, which provide multiple results to the SAC 345.

The SAC may initiate several types of queries 325, 330, 335, and 340 to identify ads that may be used to fill detected ad slots. The SAC may initiate a query to identify ads that require an absolute air time 325. For example, an advertiser may require that an ad is to be aired at 9:30 PM or not at all. The SAC may conduct such queries by further selecting ads in the database with available impression opportunities. Impression opportunities provide a measure of how long and for how many exposures an ad may be shown. For example, an advertiser may pay $100 and obtain $100 worth of impression opportunities. The cost of displaying an ad, or the cost for providing an impression opportunity, may depend on factors such as, but not limited to: number of viewers, demographic of the viewer, time of display, duration of display, personalization of ad, intrusiveness of ad (e.g., size of the ad, pausing of program, non-natural ad slot, etc.), and/or the like. Thus, if a particular ad slot carries a specified cost because of the time, or demographic, and/or other criteria, that cost will be provided as part of the query selection criteria as issued by the SAC to its database 325. Thus, ads with not enough credit to be considered for a slot will not be returned by the query 325. As such, a query on absolute air time for an upcoming time as specified by an upcoming detected ad slot 305, that query will return with results from the SAC database that match the query parameters 345.

Also, the SAC may initiate a query to identify ads that require a relative air time 330. For example, an advertiser may require an ad is to be aired in the first available natural ad slot for a specified television program. The query may further require that the SAC database returns relative air time ads if they still have credits for impression opportunities 330. Such a query will return with results from the SAC database that match the query parameters 345.

Also, the SAC may initiate a query to identify ads based on program context and available impression opportunity credits 335. For example, advertisers may wish to have their ads aired only in the context of a particular show or show type. Some advertisers may wish to employ hotspot ads of items displayed in a program, and thus provide ads that are only useful in that more limited context. In another example, advertisers may wish to air their ads during a particular type of a program that is aligned with an interest. For example, an advertiser of hardware supplies may want their ads to air only during shows discussing remodeling. As such, the SAC may search programs and metadata database tables (e.g., associated closed-captioned transcripts) containing "building materials" terms; thereby only providing ads that match such criteria. In such manner, automatic content analysis may be performed determining the appropriate placement of ads. In another example, where a family may have multiple SACs in various rooms (e.g., bedroom, living room, and kitchen), ads may be targeted towards the environment (e.g., bedding related goods, living furnishings, food products). In one embodiment, the programs and metadata database tables may include program titles, brief episode descriptions and full close-captioned transcripts of the program as a base upon which searching may be conducted. Such a query will return with results from the SAC database that match the query parameters 345. In an alternative embodiment, ads can morph based on context. When ads morph, not necessarily all of its content change, i.e., its basis remains the same over time. However, its style or background appearance may vary based on context. For example, background images, clothing, etc. may vary with the seasons and/or holidays. In an alternative embodiment, an ad can be a "serial" in itself. To obviate watching the same program over and over, the SAC inserts serial ads themselves into other programs to complete the serial. Serial ads maintain a contextual awareness of who is watching, so as to present the appropriate "next installment" to the appropriate viewer(s). In another embodiment, the SAC distinguishes between "home" and "away," e.g., in the case of mobile PVRs, in cars or portable units. Different ads can be displayed if the PVR is driven to another city or carried somewhere else. Location determination may be achieved by querying for the location of a current access point, and/or through GPS. For example, as a user walks around, if his "portable PVR" is in communication with a beacon, it may display an appropriate ad, like an ad from the nearest restaurant. In yet another embodiment, the SAC may discern a users mood. The SAC determines if the viewer is watching for pleasure, for learning, out of boredom, etc. A SmartAd can insert itself into programming to improve the viewer's mood. If the viewer is willing to enter information about his/her mood by selecting it among several choices, or it can be inferred from context (e.g., the viewer is watching all tragedies), then an appropriately funny ad can be selected. In one embodiment the funny ads may be selected because the user previously found them funny. In another context, the SAC can shop for the viewer by Webcrawling for appropriate ads (which could be made available for downloading by merchants from their websites). In yet another embodiment, it is possible to infer that the viewer "needs something" based on past purchase data stored on the PVR or elsewhere on devices connected to a home network or the Internet. For example, the user may have purchased a razor through the SAC several months ago, and thus the SAC now contextually selects razor blade ads. In another embodiment, information deduced and/or explicitly provided (e.g., information supplied when the user signs up for a cable and/or DVR service) by a user may be employed to provide contextual ads. For example, a person's account may include their birth date, and ads relating to party materials may be shown on the user's birthday.

Also, the SAC may initiate a query to identify ads based on demographics and available impression opportunity credits 335. For example, advertisers may wish to have their ads aired only in the context of a particular type of viewer.

The SAC may record user and account information in its database. This information may be provided initially to the SAS when a user creates an account with their service provider. Alternatively it may be entered into the SAC. In various embodiments, the SAC may provide for recognition of a viewer and recording of their viewing and transactional habits. Users may be recognized by logging in, i.e., by selecting a representation of their account. In one embodiment, a user would highlight their name on the screen and the SAC would know that a specified user is watching. In an alternative embodiment, biometrics may be employed (e.g., a remote control employing fingerprint, retinal scans, and/or the like). Another approach is to use face and/or voice recognition. In such an embodiment, a Webcam and microphone may be placed into the SAC and employ recognition technology. In another embodiment, inference as to who is watching may be derived by comparing behavior patters and watching conditions. Frequency of channel changes, particular programs watched, and time of viewing can help identify users with recurrent viewing habits. Further, employing Bayesian learning (and/or the like) can further target individuals and groups by learning what ads viewers enjoyed or dismissed. For example, employing metadata, closed captioned text, data in the Vertical Blanking Interval, etc. (i.e., textual data) associated with the program, to which Bayesian analysis may be applied; in such an embodiment, a user skipping through an ad provides a negative connotation to such textual data analysis, while conversely, playing through the entire ad applies a positive connotation to such textual data analysis of ads, ad types, and programming alike. Further, ad types may be targeted at various demographics and augmented to suit their tastes. Ads may be targeted to certain age groups, and based on a viewers maintained profile, age inappropriate ads, may be dismissed. Also, ads may be augmented in appearance based on such demographics. For example, ads may employ larger print text for older demographic segments. In another embodiment for older demographics, ads may be composited with less clutter. Or banner ads may be chosen over spliced ads if the viewer frequently fast forwards through spliced ads. In this manner, most any data tracked regarding a viewer may be the basis for targeting an ad. In one embodiment, the users, purchases, and accounts database tables may include such demographic and tracked information as a base upon which searching may be conducted. Such a query will return with results from the SAC database that match the query parameters 345.

Upon obtaining search results from queries to the SAC database 325, 330, 335, 340, the SAC may select an ad for an available ad slot from the query results 345. Various heuristics may be employed to select among multiple results vying for display for a given ad slot. For example, ads offering to pay the highest amount for the available ad slot may be given preference over other competing ads. Ads that are incompatible for a limited type of ad slot 315 may be excluded from the selection 345. Thus, for each available ad slot 350, the SAC will prepare and provide 355 a selected ad 345. The SAC may load selected ads 345 from its database of ads and perform any compositing, insertions, and/or the like and augmentation as may be necessary for the context of the ads airing.

For a duration of an ad slot 355, the SAC displays 370 the selected 345 ad 355 linked to the given ad slot. Upon the end of the duration for the ad slot, 355, the ad is removed and/or no longer displayed to the viewer 377. Upon having displayed a specified ad for a duration, the SAC deducts credits and/or impression opportunities for the ad in its ads database records 375. Optionally, the SAC's database tables are then updated 380. Alternatively, the SAC may update its database tables at specified intervals as initiated through cron jobs and/or the like. Upon removing ads from display 377, 375, the current program and/or normal television control may continue normally 360.

SmartAd Database Update

Figure 4:
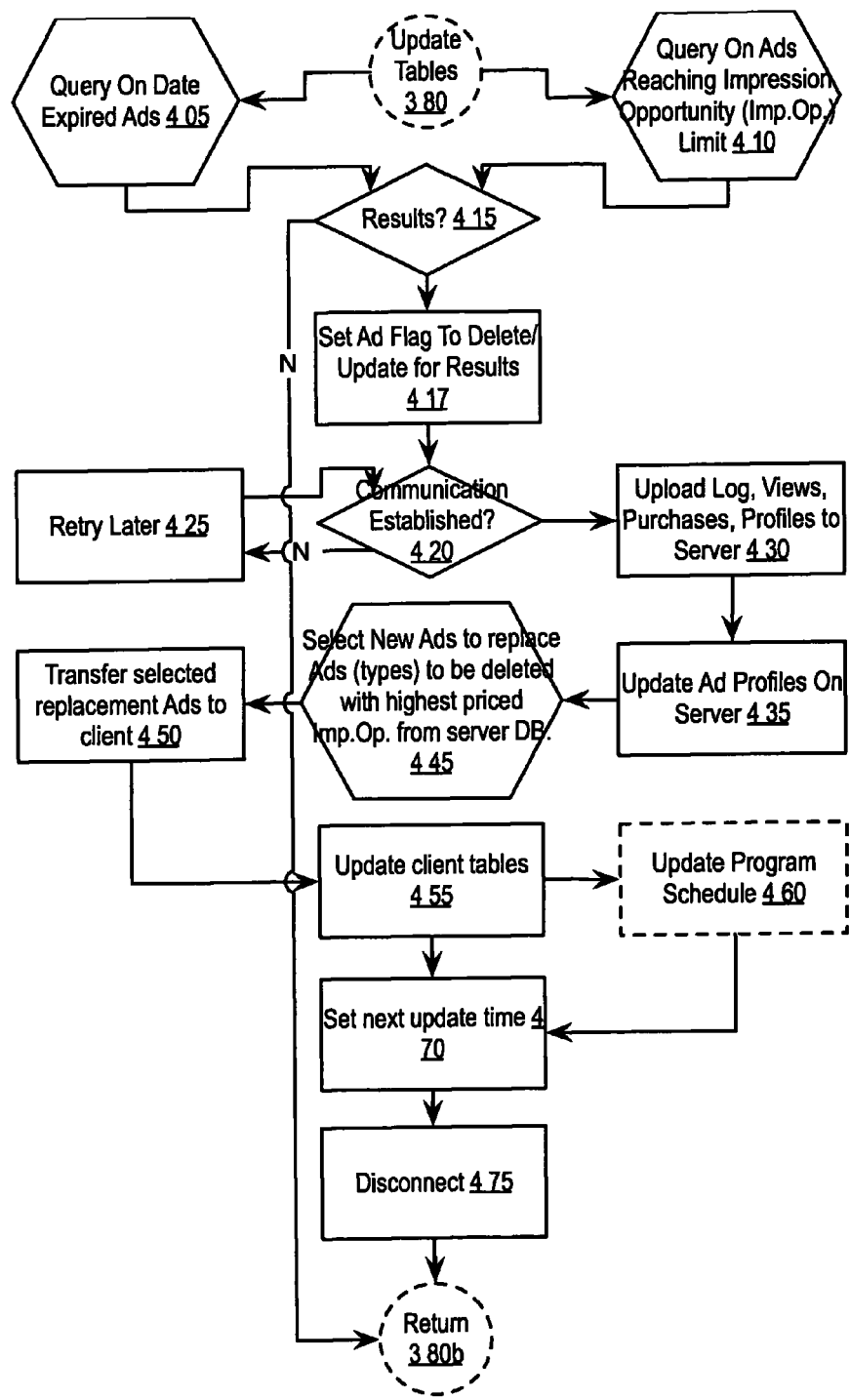
FIG. 4 is of a logic-flow diagram illustrating embodiments of updating SmartAd database tables.

FIG. 4 is of a logic-flow diagram illustrating embodiments of updating SmartAd database tables. In one embodiment, the following logic-flow executes generally at a SAC 133b. Continuing from FIG. 3, 380, database tables are updated on both the SAC and SAS 380. In one embodiment, queries are conducted on the SAC database to identify if any ads have expired 405, or if ads have reached the limit of their allotted impression opportunities 410. If no results return from such queries 405, 410, then operations may return and continue from the point of call 380. If the queries 405, 410, return results 415, a flag is set in the database records for the resulting 417 ads. The flag may be set in an ads database table record corresponding to the identified ad 415.

The SAC may then attempt to establish communications if they are not already established and/or otherwise determine if communications are established between the SAC and a SAS 420. If not communications are established 420, the SAC may try to reestablish communications at a later time 425. If communications are established between the SAC and SAS 420, the SAC provides information to the SAS 430. For example, the SAC may upload and/or synchronize user activity logs, purchases, viewing history, user profiles, flagged ad records, and/or any updated SAC database records. The SAS can then update its ad profiles in its own database 435. Thus, ad records from the SAC flagged as having provided impression opportunities may be deducted from the advertiser's account credit for impression opportunities, and/or otherwise billed to the advertiser's account.

The SAS may then select new ads from its storage device(s) to replace ads that have been marked as stale and/or otherwise have no more impression opportunities available on the SAC. Such ads will be deleted in time. The SAS may select ads from advertisers paying the highest amount for impression opportunities 445. Ads returned from the query 445 are transferred to the SAC to replace exhausted ads on the SAC 450. In one embodiment, the SAS transfers the actual ad over a communications network to the SAC. In an alternative embodiment, the SAS provides an ad schedule to the SAC, and the SAC will record and store, or otherwise provide the new selected ad itself from various content providers as already discussed in FIG. 1. Upon receiving the transferred replacement ads and/or ad information from the SAS 450, the SAC may update its database tables with the updated information and delete any exhausted ads as necessary 455. Optionally, if the SAC is working as a DVR, it may similarly update its program schedule for upcoming programs 460. After updating its tables 455, the SAC may set the next time database updating 380 is to recur 380. The SAC may then disconnect from the SAS 475, and control may continue normally and return to the point of call 380b.

Display SmartAd

Figure 5:
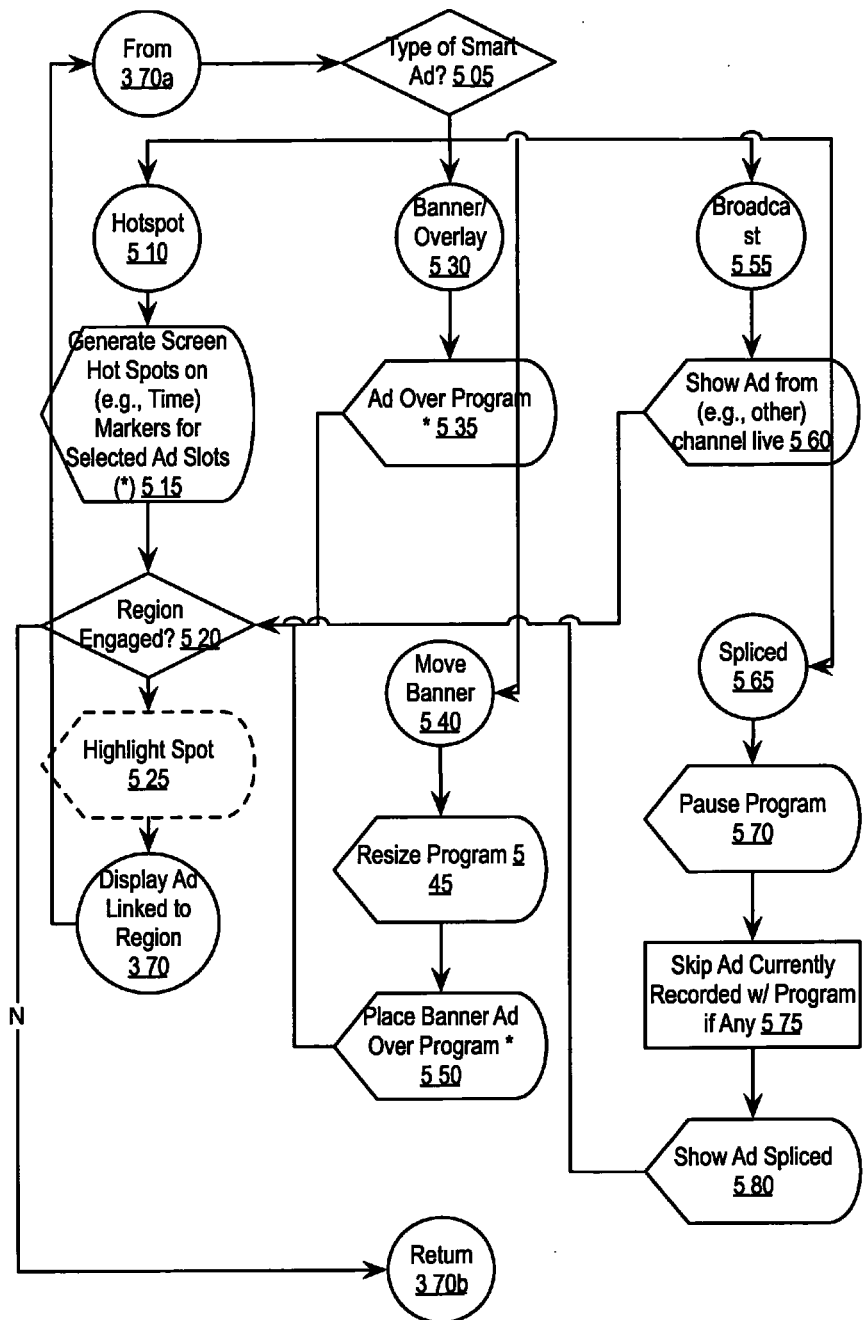
FIG. 5 is of a logic-flow diagram illustrating embodiments to display a SmartAd.

FIG. 5 is of a logic-flow diagram illustrating embodiments to display a SmartAd. Continuing from FIG. 3, 370a, the retrieved ads 355 are to be displayed. The SAC determines the type of ad that was retrieved 505. Flow will continue depending on whether a hotspot 510, banner or overlay 530, move banner 540, broadcast 555, or spliced 565 ad is identified 505. If a hotspot ad is identified 510, then the SAC generates a screen region that is engageable by an intersecting cursor (as has already been discussed in FIG. 2) 515. The SAC generates the hotspot regions at various time markers, at specified sizes and locations for the selected ad slot 515. If a cursor does not engage the region 520, flow control returns to the point of cal 370b. If the hotspot region is engaged 520, it may be optionally highlighted to provide feedback of the selection 525. If the ad is engaged, the hotspot's link is engaged 370. For example, a hotspot region may be associated with another SmartAd stored in the SAC database, which may be retrieved and subsequently displayed 370 of FIG. 3 by the SAC.

If a banner or overlay ad is identified 530, then the SAC composites and displays the retrieved 355 ad over the current program 535. As noted in FIG. 2, overlays may optionally pause the current program if interaction is ongoing. Thereafter, the SAC may check if the region defined by the ad has been engaged 520, whereby the ad itself and/or any widgets within may act as hotspots as has already been discussed.

If a move banner ad is identified 540, then the SAC resizes the current program 545 to occupy a reduced display area to accommodate the banner ad. The SAC then composites and displays the retrieved 355 ad in the freed display area 550. As noted in FIG. 2, overlays may optionally pause the current program if interaction is ongoing. Thereafter, the SAC may check if the region defined by the ad has been engaged 520, whereby the ad itself and/or any widgets within may act as hotspots as has already been discussed.

If a broadcast ad is identified 555, then the SAC may pause the current program and change its input signal to display an ad from another channel 560. This may be achieved by looking up the time and channel information for the ad in the SAC's ad schedule table in its database. Upon display of the live ad, the previous program may be un-paused, and/or a live program may be rejoined in progress as has already been discussed in FIG. 3, 360. Thereafter, the SAC may check if the region defined by the ad has been engaged 520, whereby the ad itself and/or any widgets within may act as hotspots as has already been discussed.

If a spliced ad is identified 565, then the SAC may pause 570 the current program and display the retrieved 355 ad. The SAC should then cue up the program past any block of ads that would have otherwise been displayed. 575 (i.e., past any ads originally recorded along with the original broadcast of the program). The retrieved ad 355 is then shown to the viewer. In one embodiment, the viewer may not fast-forward or skip the ad. In an alternative embodiment, the viewer may advance through the ad with fast forward normally. Upon display of the ad, the previous program may be un-paused and progress past the point of the last block of ads as has already been discussed in FIG. 3, 360. Thereafter, the SAC may check if the region defined by the ad has been engaged 520, whereby the ad itself and/or any widgets within may act as hotspots as has already been discussed.

Ad Brokering

Figure 6:
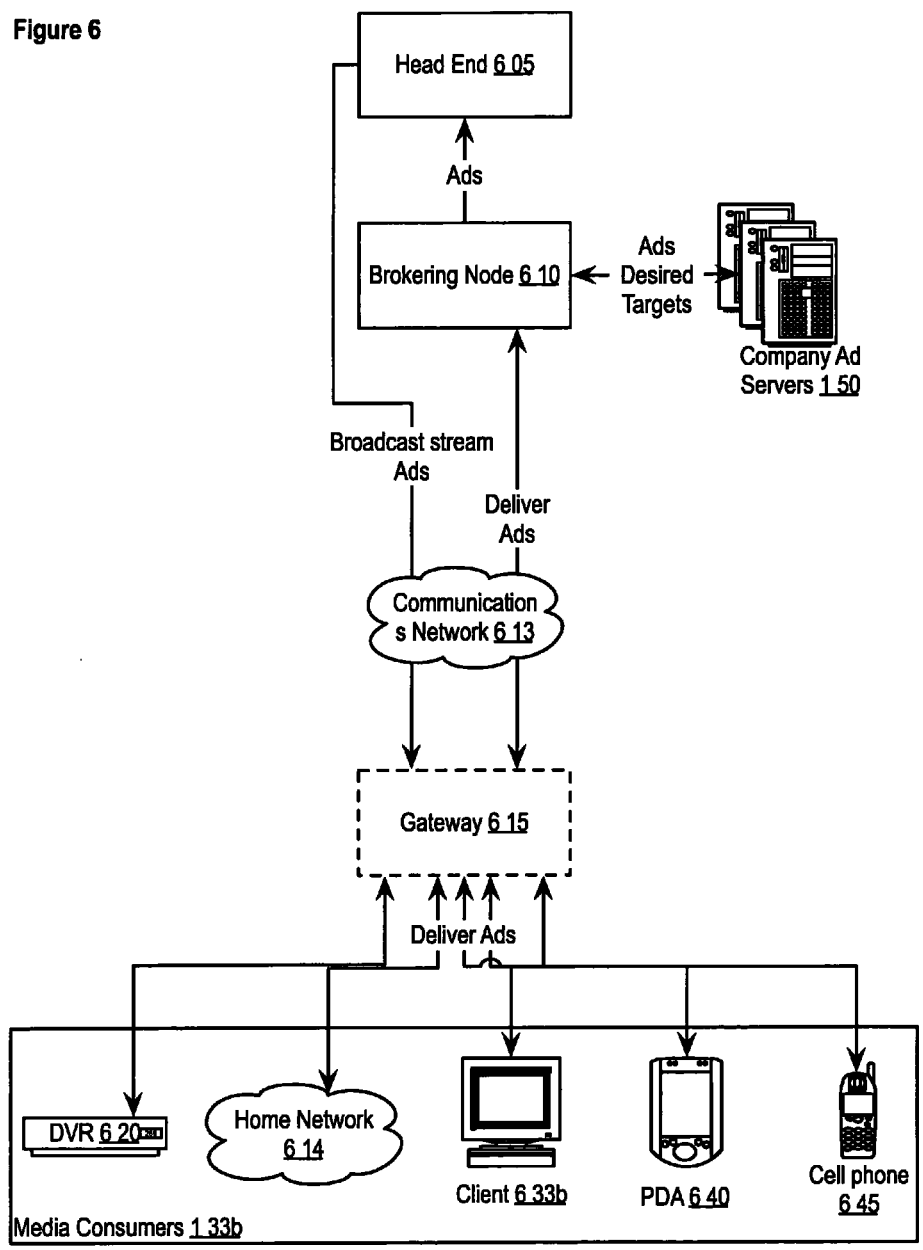
FIG. 6 is of a data-flow diagram illustrating embodiments of SmartAd brokering.

FIG. 6 is of a data-flow diagram illustrating embodiments of SmartAd brokering. An ad brokering node 610 is interconnected with and serves: a broadcaster head end 605; a gateway 615 for various media consumers 133b; and/or with the various media consumers 133b directly. Examples of media consumers include: DVRs 620, home networks and devices therein 614, personal computer clients 633b, personal digital assistants 640, cell phones 645, and/or the like. Ads may be obtained from ad servers 150 by the ad brokering node 610. The ad servers are comprised as has already been discussed 150 in FIG. 1 and throughout FIG. 8. The ad brokering node 610 is itself comprised as a server similar in composition detailed in FIG. 8. The ad server 150 stores ads supplied by advertisers in a database. The brokering node is interconnected with the ad servers and may receive ads and ad related information from the ad server 150 and update ad related information. In one embodiment, the broadcaster head end 605 and the brokering node are interconnected to media consumers through a gateway 615. The gateway 615 may act as a server to cache, filter, and route ad requests to media consumers 133b. In another embodiment, the ad brokering node 610 and the head end 605 communicate with the media consumers without the aid of a gateway 615. In one embodiment, the gateway is an Internet Service Provider that tunes its caches to retain ads from the ad brokering node 610 or head end 605. In either case, the ad brokering node 610 and head end 605 communicate with the gateway through a communications network 613. Similarly, the ad brokering node 610 itself, may be disposed in communication with the head end 605 through a communications network 613. The media consumers, also, may be connected to the gateway through a communications network.

In one embodiment, a broadcaster head end 605 obtains ads from the ad brokering node 610. The ads are cut into content prepared for broadcast. For example, a cable or satellite provider may obtain ads from the ad brokering node and insert or otherwise place the ads with content for broadcast. That content is subsequently broadcast to various media consumers capable of receiving broadcasts via gateway 615 and/or directly. In another embodiment, an ad database is updated at the head end, where it acts similarly to a media consumer device 133b. In such an embodiment, the service provider may make its broadcasts to a wide region, and at the point in the broadcast when ads are to be displayed, the head end may retrieve several ads specific to sub regions from its database cache and serve more targeted ads to localities. This allows the service provider to tailor broadcasts for geographic regions.

In another embodiment, the ad brokering node 610 serves the ads to a gateway and/or makes the ads available for retrieval from media consumers directly. The media consumers may make requests for new ads of the gateway 615, the ad brokering node 610, and of a broadcaster head end 605 when it is capable of bidirectional communications (i.e., collectively "ad outlets"). In one embodiment, even ad servers 150 may be considered to be an ad outlet.

The ability to turn to an ad broker may be subsumed in a gateway and/or in a media consumer device 133b. In one embodiment, the SAC module of a media consumer device 133b of FIG. 8 can look to ad outlets as a source of ads. In one embodiment, media consumer devices look to an ad broker 610 at specified intervals for instructions as to where to obtain future ads. In this way, the media consumer devices may be instructed to obtain ads from a specific and/or more targeted ad outlet. For example, certain ad outlets may serve particular demographic; other ad outlets may serve a particular geographic area. The ad broker may redirect media consumers to look for ads from different ad outlets as the media consumer's context, demographic, and/or geographic disposition changes with time. The ad broker may also redirect media consumers to aid in load balancing ad requests. Similarly, the ad broker may instruct media consumer devices to look to another ad broker for subsequent redirection instructions. The ability of an ad broker, dynamically, to reassign ad outlets from which media consumers may obtain ads allows each outlet to better target and more efficiently provide ads to consumers based on changing consumer contexts, demographics, geography, and/or data load demands. Similar benefits result from the ability of an ad broker to reassign another ad broker node to the task of redirecting ad requests for media consumers.

Any interval may be specified for a media consumer device to check for redirection instructions from the ad broker. In one embodiment, the media consumer checks with an assigned ad broker daily. In another embodiment, the media consumer checks with an assigned ad broker whenever the media consumer retrieves broadcast listings. In yet another embodiment, the ad broker may change the interval at which the media consumer checks for redirection instructions. The frequency of redirection may be determined based on demographic, contextual, geographical, seasonal, and/or other economic information. In another embodiment, the media consumer device 133b itself may vary the retrieval interval based on similar criteria. In yet another embodiment, administrators at the ad outlets and/or the users ad the media outlets, may schedule and/or otherwise make a real-time demand for redirection instructions.

Figure 7:
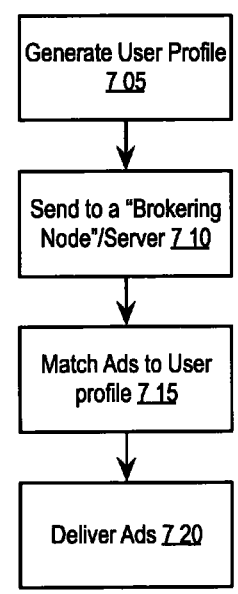
FIG. 7 is of a logic-flow diagram illustrating embodiments of SmartAd brokering.

FIG. 7 is of a logic-flow diagram illustrating embodiments of SmartAd brokering. Initially, a user profile is generated for a media consumer 705. In one embodiment, the user profile is a database record including fields such as: name, race, ethnicity, sex, orientation, age, height, weight, geographical location, content viewing statistics, ad viewing statistics, purchasing history, preferred ad types (i.e., genres like comedy, evocative, action, etc.), preferred content types (i.e., genres like comedy, horror, action, etc.), and/or the like. In another embodiment, the user profile may be maintained in structured, tagged XML files.

Over time, objective information is collected to enhance the targeting of a particular media consumer and is maintained in a user profile. The user profile is stored on the media consumer device 133b and replicated at an ad broker. The user profile allows the consumer media device 133b and the ad broker to make determinations regarding how best to target ads to a user. It should be noted that several media consumers may use a single media consumer device 133b, and as such, several profiles may reside within a single device. The user profiles are stored in a database in the consumer device 133b or the ad broker.

The objective information may be obtained explicitly by prompting the user and storing user responses to prompts, e.g., via questionnaire. Objective information may also be obtained implicitly by observing user behavior and other preferences. Objective information may include name, race, ethnicity, sex, orientation, age, height, weight, address, geographical origin, viewing preferences, viewing habits, hobbies, purchasing history, credit rating, and/or a slew of other consumer characteristics and/or demographic related information.

In one embodiment, users include their preferences for types of goods and advertisements in their profile directly. As already discussed, this may be achieved through an interactive questionnaire. For example, a form asking if they like certain segments of goods or services may be provided on screen. The user can provide positive indication or negative indication for each segment, thereby building up a profile. In another embodiment, a telephone interviewer can call the viewer and query the user, and enter the information which is thereafter entered into the users profile. In another embodiment, the user may simply enter wild-card keyword terms for goods and/or services for which they would like to see ads. In a "want to see" dialogue screen, they may enter as many terms as they like via on screen keyboard, actual keyboard, remote control, and/or the like input device. They may even put in genre terms such as: funny, evocative, action, etc. As well as brand names, and product and service types. An example string of keywords may include: beer, funny, action, gadgets, cars, Time Warner, DVD. Similarly, the user may enter terms in a "don't want to see" dialogue window. These keywords would be saved as likes and dislikes in the users profile and used for querying for ads. In this manner, both advertisers and users can generate ad requests for the ad outlets to supply. The system may provide one way queries where only the users or only the advertisers may query for ad deployment. Also, the system may provide two way queries where advertisers make queries and provide some portion of ads to media consumers 133b, and the users' profiles generate queries and obtain the remaining portion of ads based on their profile rather than the advertisers targeting. In one embodiment, when there is not sufficient advertising bids to saturate a viewer's ad space on there media consumer device 133b, then the user's profile will generate a query from which the remaining ads will be selected. In another embodiment, the user will be charged for specific queries for ads as part of an ad research service.

Further, the user may be queried as to his/her likes and dislikes. Again, responses may be obtained both explicitly and implicitly. The user may be asked about preferences regarding ads, shows, brands, movies, and/or the like. For example, correlations for a demographic may be discerned by monitoring the likes/dislikes in ads and various genres of content entertainment, which in turn may be used to better target ads. For example, viewers that enjoy cooking shows may also enjoy advertisements for certain foods. In one embodiment, the user is prompted to respond to survey questions at various intervals. In one embodiment, the user is provided with incentives for responding to the survey questions such as monthly discounts to their content provider, reduction in the number of ads, better control over skipping ads, money, and/or other consideration. In another embodiment, the user is tracked as to preferences to certain ads.

For example, ads for only a specific product or brand may be shown to the user. For ease of cognition let's assume that on one occasion a viewer is shown only beer ads for brand X beer. The user's viewing device 133b tracks the user's actions with regard to the ad. For example, the viewing device 133b may track if the user watches the ads, skips portions of the ads, or fast forwards past the ads all together. The device may also allow the user to enter indicia of their like or dislike for an ad. A user may provide positive indicia (e.g., depressing a "show me" button on a remote control) indicating that they wish to view the remainder of an ad. Alternatively, the user may provide negative indicia (e.g., depressing a "skip it" button on a remote control) indicating that they do not wish to view the remainder of an ad. Also, simply fast forwarding or otherwise skipping and ad or content may be recorded as negative indicia. Conversely, viewing an entire ad without fast forwarding may be viewed as positive indicia. For example, on a TiVo, the user may indicate approval of a program by engaging a "thumbs up" up button a number of times, or conversely indicating disapproval by engaging the "thumbs down" button; these buttons could be re-assigned for ad approval/skipping. On another occasion, a user may be targeted with ads for only brand Y beer. By comparing and contrasting the viewing statistics collected by the viewing device 133*b* for each of the brands, brand preference may be determined and stored as part of that users profile. Further, ads may be shown only for a single product, e.g., brand X beer. However, the genre of ad may be varied. On one occasion the user may be shown only comedy based ads, while on another occasion only comparison based ads are shown. In another embodiment, attention may be paid as to which portions of an ad a particular user watches, e.g., the funny portions, the ironic portions, the informative portions, etc. Based on viewing statistics maintained by the viewing device 133*b*, a preference for ad type may be discerned and stored to the user's profile.

Upon generating a user profile 705, the profile is sent to the ad broker 710. User profile updates may be sent to the ad broker at various specified intervals. These updates may be performed at the same intervals as the interval for checking for redirection instructions, as has already been described in FIG. 6. In an alternative embodiment, profile updates are updated based on their own specified interval.

The user profiles are used to target ads at viewers. The ad broker ultimately matches advertisers with an available pool of media consumers. To do this, the ad broker uses advertiser bids (which will be discussed in greater detail in "Ad Broker Negotiation," below) as a basis for a query on user profiles and the query selects/matches media consumer profiles. Then the matching user profiles are used to query an ad database for ads belonging to the particular advertiser that uses selected the matching user profile. As such, for users to find matching ads, first advertisers can find matching user profiles 715. This allows the ad broker to find ads 715 that are most likely to be effective, i.e., viewed, for a given user. Correlation of likes/dislikes may be generated from the collection of positive/negative indicia for various ads over time, which are stored in the users profile. For example, if a user profile indicates that the viewer only views funny ads, or always skips evocative ads, the selection of an ad targeting their particular tastes may be selected. This may be achieved by tagging and/or otherwise associating metadata with an advertisement. The metadata may contain information on the genre of ad, the advertiser, the creator of the advertisement, the types of goods, the cost of goods, and a multitude of other brand and product parameters. The user's profile is then employed as a query. For example, if the user's profile indicates the user never watches beer ads, a query may be constructed excluding beer ads. Thus, if a user always skips brand Y beer, no keyword token of "brand Y beer" will be used in the generation of the ad query. Also, any keyword terms in the profile of likes and/or dislikes may be used as the basis of a query. If a user shows a preference for only a particular brand, e.g., brand X, beer, then only brand X beer ads may be shown. Alternatively, if brand Y beer wishes to market to a viewer preferring brand X, brand Y beer ads that are similar in genre (e.g., funny ads, evocative ads, etc.) to brand X beer ads viewed by the user in the past may be selected. The user profile field values may be used as search query tokens and, thus, generate any types of queries allowing advertisers to select viewer targets most likely to be receptive to their ads.

Upon matching ads based on user profiles 715, ads are delivered 720 to media consumer devices 133*b*. The ads may be shown to all and/or selected users on the media consumer devices. Users may be discerned based on log-in, viewing habits, etc. as has already been discussed. The format and delivery of the ads has already been discussed, but, for example, may include a video ad in MPEG format that is transferred via HTTP, FTP, etc. protocols and will then be interspersed within content viewed by the viewer. In one embodiment and intermediate server matches the ads with user profiles 715 and sends the ads 720 to media consumers 133*b*. In another embodiment, the media consumer's device 133*b* is provided with an ad database and makes the match and decides on what ad to pull from an ad server 150 from over a communications network 613.

Ad Broker Negotiation

When negotiating with an ad broker 610, the advertiser may provide a query specifying various advertising constraints including: a demographic target, the number of viewers they wish to see their advertising, the number of impressions they wish to make per viewer, and the amount the advertiser is willing to pay per impression, and/or the like. The structure of payment may be further refined to amounts for a viewer: (a) to view and an entire ad; (b) the amount to be paid for a viewer to fast forward through the ad, but stop and view a portion of the ad; (c) the amount to be paid for a viewer to fast forward through the ad, and the amount to be paid for a viewer skipping the ad; (d) a desired time period for ad impressions to be made; (e) total number of milliseconds spend viewing and/or fast forwarding through the ad; and/or the like. Even for item (c) above there is value for the advertiser in discerning that some ads do not work for a particular viewer and/or group of viewers. Once the query is collected from the advertiser, and it may be provided for example by way of an HTML or XML order entry form, it is normally submitted to an ad broker node 610, which schedules the ad with suitable media consumer devices 133*b* that require refreshed ads. In one example, the ad broker 610 collects queries from advertisers and treats them like bids. The highest bids are given priority and targeted to the most valuable demographic targets. In another embodiment, the bids resulting in the largest revenues are given priority. For example, a bid may be submitted with a very high payment per impression, but for a very limited target demographic; conversely, a second bid may have a relatively low payment per impression, but is targeting a large demographic—in such a scenario, a lower per-impression bid would generate more revenue and would receive priority. Once those target media consumers 133*b* have been saturated with ads for a given period of time and/or number of upcoming viewings of content, then remaining bids may be aligned with the next best targets for a given demographic. For example, if a bid was submitted for a demographic including ages 20-25, and all such viewers have been saturated with ads by other bidders, the advertiser may be informed of such and have the opportunity to alter their query characteristics. The advertiser may simply resubmit the bid for an alternate time or change any of the characteristics after being informed of the failed bid; thereafter, the advertiser may resubmit the bid.

In another embodiment, individual advertisers may contact individual media consumers 133*b* instead of ad brokers 610 and negotiate an ad delivery. For example, an advertiser may negotiate through similar fee structures with the media consumer. The advertiser may query the media consumer device 133*b* for its user profiles, and then decide if they wish to supply ads to that device 133*b*. The advertiser 150 may generate a query for ads based on the user profile, as has already been described, and select appropriate ads for delivery to the media consumer device 133b. In one embodiment, the advertiser will supply the media consumer device 133b with a query specifying various advertising constraints, as was mentioned above—however, no demographic information need be supplied in this query as this was already determined, above, by the advertiser. The media consumer device 133b may then determine if ads need refreshing, and if so, provide the advertiser with approval and/or disapproval to send the ads. In one embodiment, the media consumer device may require payment to receive the ads. In such an embodiment, a payment (e.g., micropayment) may be made to the consumer directly. In another embodiment, a payment may be made to the consumer's service provider, e.g., cable company, and act to reduce the cost of their monthly fees for service. Various fees may be paid based on payment structures, a-e, already discussed above. Payments may be provided as credits through consumers credit card accounts, or to accounts established by their service provider. In yet another embodiment, the payments may be collected by the service provider as a subsidy for content provision. In yet another embodiment, purchases made from interactive ads may generate commissions to be paid either to the service provider, or act as a discount for the consumer of goods for the goods themselves or for the service provider's services.

In another embodiment, media consumers must watch a specified number of ads in a given time period and are compensated with free or reduced cost content service provision. For example, a given media consumer may required to watch 100 ads in a month, and if they fulfill that quota, will not have to pay their cable company a monthly fee. If the media consumers fail to watch the specified number of ads they will have to pay a certain amount representing how many ads the user was shy of their quota. In another embodiment, the media consumer is charged a fixed monthly fee if the media consumer is shy of the quota by one or more viewings.

SmartAd Client Controller

Figure 8:
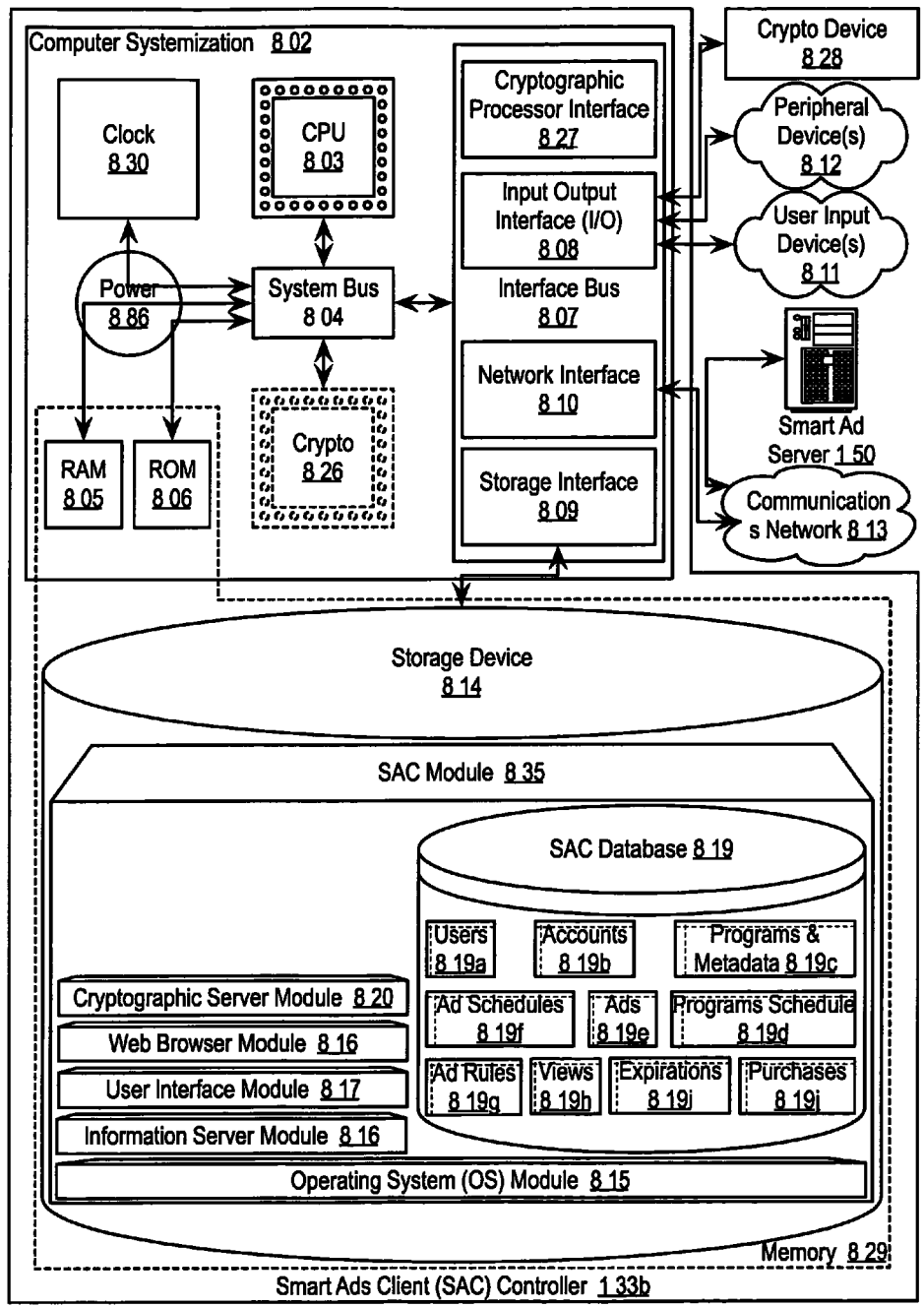
FIG. 8 is of a block diagram illustrating embodiments of a SmartAd Client controller.

FIG. 8 is of a block diagram illustrating embodiments of a SmartAd Client (SAC) controller 133b, 801. In this embodiment, the SAC controller 801 may serve to process, store, search, serve, identify, instruct, generate, match, and/ or update ad and/or program related data.

In one embodiment, the SAC controller 801 may be connected to and/or communicate with entities such as, but not limited to: one or more users from user input devices 811; peripheral devices 812; and/or a communications network 813. The SAC controller may even be connected to and/or communicate with a cryptographic processor device 828. The SAC controller may communicate with a SmartAd Server (SAS) 150 through the communications network. The SAS may be configured to serve multiple SACs employing a similar composition to the SAC. The SAS provides greater database storage capacity to store ads for and data so as to service multiple SACs. Further, the SAS employs greater capacity and/or more robust components to better server multiple SACs. In one embodiment, the SAS may be distributed to better serve SAC demands and better balance load and/or service requests.

A SAC controller 801 may be based on common computer systems that may comprise, but are not limited to, components such as: a computer systemization 802 connected to memory 829.

Computer Systemization

A computer systemization 802 may comprise a clock 830, central processing unit (CPU) 803, a read only memory (ROM) 806, a random access memory (RAM) 805, and/or an interface bus 807, and most frequently, although not necessarily, are all interconnected and/or communicating through a system bus 804. Optionally, the computer systemization may be connected to an internal power source 886. Optionally, a cryptographic processor 826 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the SAC controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 886 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 886 is connected to at least one of the interconnected subsequent components of the SAC thereby providing an electric current to all subsequent components. In one example, the power source 886 is connected to the system bus component 804. In an alternative embodiment, an outside power source 886 is provided through a connection across the I/O 808 interface. For example, a USB and/or IEEE 1394 connection carries both data and power across the connection and is therefore a suitable source of power.

Interface Adapters

Interface bus(ses) 807 may accept, connect, and/or communicate to a number of interface adapters, conventionally although not necessarily in the form of adapter cards, such as but not limited to: input output interfaces (I/O) 808, storage interfaces 809, network interfaces 810, and/or the like. Optionally, cryptographic processor interfaces 827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 809 may accept, communicate, and/or connect to a number of storage devices such as, but not limited to: storage devices 814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 810 may accept, communicate, and/or connect to a communications network 813. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Carrier mediums may include: cable, satellite, telephone, utility, and/or the like. A network interface may be regarded as a specialized form of an input output interface. Further, multiple network interfaces 810 may be used to engage with various communications network types 813. For example, multiple network interfaces may be employed to allow for the communication over broadcast, multicast, and/or unicast networks.

Input Output interfaces (I/O) 808 may accept, communicate, and/or connect to user input devices 811, peripheral devices 812, cryptographic processor devices 828, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a/b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 811 may be card readers, dongles, finger print readers, gloves, graphics tablets, joysticks, keyboards, mouse (mice), remote controls, retina readers, trackballs, trackpads, and/or the like.

Peripheral devices 812 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the SAC controller may be embodied as an embedded, dedicated, and/or monitor-less (i.e., headless) device, wherein access would be provided over a network interface connection.

Cryptographic units such as, but not limited to, microcontrollers, processors 826, interfaces 827, and/or devices 828 may be attached, and/or communicate with the SAC controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 829. However, memory is a fungible technology and resource, thus, any number of memory embodiments may be employed in lieu of or in concert with one another. It is to be understood that a SAC controller and/or a computer systemization may employ various forms of memory 829. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 829 will include ROM 806, RAM 805, and a storage device 814. A storage device 814 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 829 may contain a collection of program and/or database modules and/or data such as, but not limited to: operating system module(s) 815 (operating system); information server module(s) 816 (information server); user interface module(s) 817 (user interface); Web browser module(s) 818 (Web browser); database(s) 819; cryptographic server module(s) 820 (cryptographic server); SAC module(s) 835; and/or the like (i.e., collectively a module collection). These modules may be stored and accessed from the storage devices and/or from storage devices accessible through an interface bus. Although non-conventional software modules such as those in the module collection, typically, are stored in a local storage device 814, they may also be loaded and/or stored in memory such as: peripheral devices, RAM, remote storage facilities through a communications network, ROM, various forms of memory, and/or the like.

A SAS may be similarly configured but instead would employ a SAS module and SAS database.

Operating System

The operating system module 815 is executable program code facilitating the operation of a SAC controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the SAC controller to communicate with other entities through a communications network 813. Various communication protocols may be used by the SAC controller as a subcarrier transport mechanism for interaction, such as, but not limited to: multicast, TCP/IP, UDP, unicast, and/or the like.

Information Server

An information server module 816 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on a SAC controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including, itself, and/or facilities of the like. Also, universal Description, discover and Integration (UDDI), Web Services Description Language (WSDL), and Web Services Flow Language (WSFL) may be used as a basis for data transfer and component updates. Most frequently, the information server communicates with the SAC database 819, operating systems, other program modules, user interfaces, Web browsers, and/or the like.

Access to the SAC database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SAC. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SAC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

A user interface module 817 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/ or provide program module, system, user, and/or data communications, requests, and/or responses.

Web Browser

A Web browser module 818 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from SAC enabled nodes. The combined application may be nugatory on systems employing standard Web browsers.

Cryptographic Server

A cryptographic server module 820 is stored program code that is executed by the CPU 803, cryptographic processor 826, cryptographic processor interface 827, cryptographic processor device 828, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SAC may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable a SAC module to engage in secure transactions if so desired. The cryptographic module facilitates the secure accessing of resources on SAC and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

SAC Database

A SAC database module 819 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SAC database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the SAC database is implemented as a data-structure, the use of the SAC database 819 may be integrated into another module such as the SAC module 835. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database module 819 includes several tables 819a-j. A users table 819a includes fields such as, but not limited to: an user name, address, user_id, credit card information, and/or the like. The user table may support and/or track multiple users on a SAC and/or a SAS. An accounts table 819b includes fields such as, but not limited to: account_id, admin_user_id (a user given administrative status to control the account), account_level, and/or the like. A programs_metadata table 819c includes fields such as, but not limited to: program_title, program_description, program_id, closed_captioned_text, program_data, program_schedule_id, and/or the like. A programs_schedule table 819*d* includes fields such as, but not limited to: program_id, ad_id, air_time, duration, ad_shedule_id, and/or the like. An ads table 819*e* includes fields such as, but not limited to: ad_id, ad title, ad description, ad_closed_captioned_text, ad_data (e.g., HTML, XML, media data, etc.), ad_schedule_id, program_id, program_schedule_id, and/or the like. An ad schedule table 819*f* includes fields such as, but not limited to: ad_id, air_time, duration, program_shedule_id, program_id, and/or the like. An ad rules table 819*g* includes fields such as, but not limited to: ad_id, expiration_id, account_id, user_id, views_id, demographics, rule (e.g., an SQL defined query to make rules based selections), and/or the like. A views table 819*h* includes fields such as, but not limited to: view_id, ad_id, program_id, user_id, view_start, view_duration, and/or the like. An expirations table 819*i* includes fields such as, but not limited to: expirations_id, ad_id, program_id, view_id, impression_opportunity_count, expiration_date, expiration_condition (e.g., a conditional to set expirations), and/or the like. An purchases table 819*j* includes fields such as, but not limited to: ad_id, program_id, view_id, expirations_id, account_id, users_id, debit_value, and/or the like. A SAS database in for a SAS is similarly configured, but more expansive, serving multiple SACs.

In one embodiment, user programs may contain various user interface primitives, which may serve to update the SAC. Also, various accounts may require custom database tables depending upon the environments and the types of clients a SAC may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 819*a-j*. The SAC may be configured to keep track of various settings, inputs, and parameters via database controllers.

A SAC database may communicate to and/or with other modules in a module collection, including itself, and/or facilities of the like. Most frequently, the SAC database communicates with a SAC module, other program modules, and/or the like. The database may contain, retain, and provide information regarding other nodes and data.

SAC

A SAC module 835 is stored program code that is executed by the CPU. The SAC affects accessing, obtaining and the provision of information, services, transactions, and/or the like across various communications networks.

The SAC enables advertisers to provide viewers with dynamic and non-stale advertising. The SAS module is complementary to the SAC module and provides services to the SAC. The SAS employs a more expansive SAS database. Also, the SAS module interacts and serves more data to the multiple SACs through its information server. The SAC collects ads, tracks viewing habits, enables product purchasing, composites ads, deploys ads in new contexts, and more. The SAC coordinates with the SAC database to identify interassociated items relating to programs, ads, and/or any related transactions and acts upon any provided information.

A SAC module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. In one embodiment, the SAC server employs a cryptographic server to encrypt and decrypt communications. A SAC module may communicate to and/or with other modules in a module collection, including itself, and/or facilities of the like. Most frequently, the SAC module communicates with a SAC database, operating systems, other program modules, and/or the like. The SAC may contain, communicate, generate, obtain, and/or provide program module, system, user, and/or data communications, requests, and/or responses.

Distributed SAC

The structure and/or operation of any of the SAC node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the SAC controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of space and reducing repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. In a system for delivering ads to media consumers viewing content through a processor based ad server, a method of serving ads comprising the steps of:
   obtaining media consumer profiles by said ad server;
   effecting delivery of an ad to a media customer by said ad server, by playing at least a portion of said ad at one of a normal speed and a second speed other than normal speed as determined by how a particular customer elects to watch said ad;
   receiving by said ad server ad information descriptive of how delivered ads are watched by a media consumer; and
   generating a first compensation information by said ad server indicative of how a source of said ad is compensated based on said at least one portion of said ad being delivered to the media customer at said first speed; and
   generating a second compensation information by said ad server indicative of how the source of said ad is compensated based on said at least one portion of said ad being delivered at said second speed.

2. The method of claim 1, wherein the compensation provides media consumers with free content service provision when media consumers view a specified number of ads within a specified interval of time.

3. The method of claim 1, wherein content is delivered by way of a satellite broadcast.

4. The method of claim 1, wherein content is delivered by way of a cable broadcast.

5. The method of claim 1, wherein content is delivered by way of a radio-wave broadcast.

6. The method of claim 1 wherein said ads are interspaced with other content and the ads are presented sequentially.

7. A processor based method of compensating a media provider providing media including ads and content to a media consumer, the method comprising:
   delivering said ads and content to a media consumer, including playing said media at one of a normal speed and a second speed other than normal speed;
   monitoring the delivery of said media to said media consumer to determine if at least one of said ads is watched at one of said normal and said second speed; and
   calculating by said processor a compensation for said media provider, wherein said compensation is different when said media is played at normal speed then when said media is played at said second speed.

8. The method of claim 1 wherein said compensation information is defined as
   (a) a payment of an amount defined by how a media customer watches said ad, selected from: a first amount for said media customer watching said ad in its entirety at a normal speed; and
   (b) second amount for said media customer not watching at least part of said ad.

9. The method of claim 8 wherein said second amount is selected from (i) a third amount for said media viewer fast forwarding a part of said ad and viewing another part of said ad at normal speed; (ii) a fourth amount for said media customer fast forwarding through said entire ad; (iii) a fifth amount for said media customer skipping said ad; (iv) a sixth amount based on a total time that an ad is being presented to said media customer.

10. The method of claim 7 wherein during said step of calculating a first amount is selected if said ad is viewed by said media customer at a normal speed and a second amount is selected if at least a part of said ad is fast forwarded by said media customer.

11. The method of claim 7 wherein during said step of calculating a first amount is selected if said ad is skipped at least in part by said media customer.

12. The method of claim 7 wherein said compensation is defined as a payment of an amount defined by how a media customer watches said ad, selected from:
(a) a first amount for said media customer watching said ad in its entirety at a normal speed; and
(b) second amount for said media customer not watching at least part of said ad.

13. The method of claim 12 wherein said second amount is selected from (i) a third amount for said media viewer fast forwarding a part of said ad and viewing another part of said ad at normal speed; (ii) a fourth amount for said media customer fast forwarding through said entire ad; (iii) a fifth amount for said media customer skipping said ad; (iv) a sixth amount based on a total time that an ad is being presented to said media customer.

* * * * *